US012525864B2

(12) United States Patent
Falconar et al.

(10) Patent No.: US 12,525,864 B2
(45) Date of Patent: Jan. 13, 2026

(54) METHOD FOR COMPENSATING REACTIVE POWER, ASSOCIATED CONTROL SYSTEM, AND SENSOR DRIVER CIRCUIT

(71) Applicants: SKF Magnetic Mechatronics, Saint-Marcel (FR); SKF Canada Limited, Scarborough (CA)

(72) Inventors: Nicholas Falconar, Calgary (CA); Jinyi Xie, Hébécourt (FR); Lakdar Sadi-Haddad, Nogent sur Marne (FR)

(73) Assignee: SKF Magnetic Mechatronics; SKF Canada Limited, Scarborough (CA)

( * ) Notice: Subject to any disclaimer, the term of this patent is extended or adjusted under 35 U.S.C. 154(b) by 196 days.

(21) Appl. No.: 18/405,009

(22) Filed: Jan. 5, 2024

(65) Prior Publication Data

US 2024/0243652 A1    Jul. 18, 2024

(30) Foreign Application Priority Data

Jan. 13, 2023   (FR) ...................................... 2300332

(51) Int. Cl.
H02M 1/088    (2006.01)
H02M 1/00    (2006.01)
H02M 3/335    (2006.01)

(52) U.S. Cl.
CPC ......... *H02M 1/0043* (2021.05); *H02M 1/088* (2013.01); *H02M 3/33515* (2013.01); *H02M 3/33592* (2013.01)

(58) Field of Classification Search
CPC ............... H02M 1/0043; H02M 1/088; H02M 3/33515; H02M 3/33592
See application file for complete search history.

(56) References Cited

U.S. PATENT DOCUMENTS 9,966,892 B2     5/2018 Cossart et al.
11,482,956 B2 * 10/2022 Augsburger ............. H02P 1/00
(Continued)

FOREIGN PATENT DOCUMENTS

CN    107658888 A    2/2018
EP    2937976 B2    11/2017

OTHER PUBLICATIONS

Preliminary Search Report of the National Intellectual Property Office of France in Application No. FR2300332, dated Jan. 13, 2023; 9pgs.

Primary Examiner — Adolf D Berhane
(74) Attorney, Agent, or Firm — Stinson LLP (57) ABSTRACT

A control system (15) for controlling a full bridge converter to compensate the reactive power consumed by an inductive position sensor for a rotor of an electrical machine supported by at least one active magnetic bearing is proposed. The inductive position sensor is supplied by an alternating current source. The control system (15) includes a phase shift determining means (26) to determine a phase shift ($S_P$) between a supply voltage ($V_S$) and a supply current ($I_S$) delivered by the source. A first control loop (22) controls the amplitude (Ac) of a control signal ($S_C$) from the phase shift ($S_P$). A second control loop (23) controls the phase of the control signal ($S_C$). A third control loop (24) controls a voltage reference ($V_R$). A controlling means (25) controls a full bridge converter according to the control signal ($S_C$).

16 Claims, 6 Drawing Sheets

(56) References Cited

U.S. PATENT DOCUMENTS

| | | | |
|---|---|---|---|
| 12,308,767 B2 * | 5/2025 | Vidlak | .................... H02P 21/18 |
| 2008/0106099 A1 | 5/2008 | Ichinose et al. | |
| 2012/0019188 A1 | 1/2012 | Fukutani et al. | |

\* cited by examiner

METHOD FOR COMPENSATING REACTIVE POWER, ASSOCIATED CONTROL SYSTEM, AND SENSOR DRIVER CIRCUIT

CROSS-REFERENCE TO RELATED APPLICATION

This application claims priority to French Application No. 2300332, filed Jan. 13, 2023, the entirety of which is hereby incorporated by reference.

FIELD

The present disclosure relates to magnetic bearings and more particularly to the compensation of reactive power of inductive position sensors in magnetic bearings.

The present disclosure more particularly relates to a method for compensating the reactive power consumed by such a sensor, a control system, and a sensor driver circuit.

BACKGROUND

Magnetic bearings are used in different rotating machines such as electric motors, compressors, turbines, or the like in order to maintain the axial or/and radial positions of a rotor by means of magnetic fields acting on the rotor of the machine.

Inductive position sensors are used in magnetic bearing controllers (MBC) to measure rotor position.

Inductive position sensor are generally inductive loads.

The value of the inductive load varies significantly between sensors.

Furthermore, the inductive position sensors may be located far from the MBC such that the cable connecting the inductive position sensors to the MBC adds an additional capacitive and inductive load depending on the length and the size of the cable.

As the inductive position sensors are supplied by alternating current (AC) sources, the inductive position sensors draw a large amount of reactive power which needs to be compensated.

Document U.S. Pat. No. 9,966,892 discloses an automatic reactive power compensation device for automatically compensating the reactive power consumed by an inductive position sensor.

The device generates reactive current proportional to the current consumed by the inductive position sensor.

The automatic reactive power compensation device uses a half bridge converter comprising two switches and two capacitors, the switches being controlled such that the capacitors deliver a compensation current to compensate the reactive current.

Sensors and filters are needed to determine the reactive current.

A time delay caused by said sensors and filters is introduced.

Furthermore, as the voltage of the capacitors is fixed, the range of sensors that will work with the prior art is limited.

SUMMARY

Consequently, the present disclosure intends to overcome wholly or partially these disadvantages.

According to an aspect, a method for compensating the reactive power consumed by at least one inductive position sensor for a rotor of an electrical machine supported by at least one active magnetic bearing is proposed.

The inductive position sensor is supplied by an alternating current (AC) source and measures an axial or radial displacement of the rotor.

The method comprises:
determining a phase shift between a supply voltage and a supply current delivered by the AC source,
determining the amplitude of a control signal from the determined phase shift,
determining a voltage reference value for an energy storage device from the amplitude of the control signal and a duty cycle reference value,
determining the phase of the control signal from the voltage of the energy storage device and the voltage reference, and
controlling the full bridge converter according to the control signal to generate the compensation current to bring the supply current in phase with the supply voltage.

The method may compensate reactive power consumed by different sensor/cable combinations without changing circuit element values.

Furthermore, the method is robust to the time delay caused by the sensors/filters.

Preferably, the determination of the phase shift comprises determining the sign of the supply voltage, the sign of the supply current, and the sign of the derivative of the supply voltage:
the supply current lags the supply voltage when the sign of the supply voltage is positive, the sign of the supply current is negative, and the sign of the derivative of the supply voltage is positive or when the sign of the supply voltage is negative, the sign of the supply current is positive, and the sign of the derivative of the supply voltage is negative,
the supply current leads the supply voltage when the sign of the supply voltage is positive, the sign of the supply current is negative, and the sign of the derivative of the supply voltage is negative or when the sign of the supply voltage is negative, the sign of the supply current is positive, and the sign of the derivative of the supply voltage is positive, and
the supply current is in phase with the supply voltage when the sign of the supply voltage is always equal to the sign of the supply current.

Advantageously, the control signal is a periodic function having the same frequency as the frequency of the supply voltage.

Preferably, the control signal is a periodic function resulting from the multiplication of a supply voltage reference phase shifted by a reference angle by the amplitude of the control signal.

Advantageously, the reference angle is determined from the supply voltage.

Preferably, the periodic function is a sinusoidal function.

According to another aspect, a control system is proposed.

The control system is configured for controlling a full bridge converter to compensate the reactive power consumed by at least one inductive position sensor for a rotor of an electrical machine supported by at least one active magnetic bearing, the inductive position sensor measuring the displacement of the rotor and being supplied by an AC source.

The control system comprises:
a phase shift determining means configured to determine the phase shift between a supply voltage and a supply current delivered by the AC source, a first control loop configured to control the amplitude of a control signal from the determined phase shift, a second control loop configured to control the phase of the control signal from the voltage of the energy storage device and a voltage reference, a third control loop configured to control the reference voltage for an energy storage device from the amplitude of the control signal and a duty cycle reference value, and a controlling means configured to control the full bridge converter according to the control signal to generate the compensation current to bring the supply current in phase with the supply voltage.

Advantageously, the phase shift determining means comprises a logic circuit comprising a least three logical comparators, a plurality of logic gates, a plurality of summation operators, a controller, and at least one differentiator. The logic circuit is configured to determine the phase shift from the sign of the supply voltage, the sign of the supply current, and the sign of the derivative of the supply voltage. The supply current lags the supply voltage when the sign of the supply voltage is positive, the sign of the supply current is negative, and the sign of the derivative of the supply voltage is positive or when the sign of the supply voltage is negative, the sign of the supply current is positive, and the sign of the derivative of the supply voltage is negative. The supply current leads the supply voltage when the sign of the supply voltage is positive, the sign of the supply current is negative, and the sign of the derivative of the supply voltage is negative or when the sign of the supply voltage is negative, the sign of the supply current is positive, and the sign of the derivative of the supply voltage is positive. The supply current is in phase with the supply voltage when the sign of the supply voltage is always equal to the sign of the supply current.

According to another aspect, a system for compensating the reactive power consumed by at least one inductive position sensor for a rotor of an electrical machine supported by at least one active magnetic bearing is proposed.

The system comprises a control system as defined above and a full bridge converter comprising four switches and an energy storage device, each switch being coupled to the control system to transfer the compensation current to and from the energy storage device.

According to another aspect, a sensor driver circuit for at least one inductive position sensor for a rotor of an electrical machine supported by at least one active magnetic bearing is proposed.

The sensor driver circuit comprises a transformer including a primary circuit and a secondary circuit configured to supply the inductive position sensor, an AC source connected to the primary circuit, and a system as defined above connected to the primary circuit.

BRIEF DESCRIPTION OF THE DRAWINGS

Other advantages and features of the present disclosure will appear on examination of the detailed descriptions of the embodiments, this is in no way restrictive. The appended drawings are described below.

DETAILED DESCRIPTION

Figure 1:
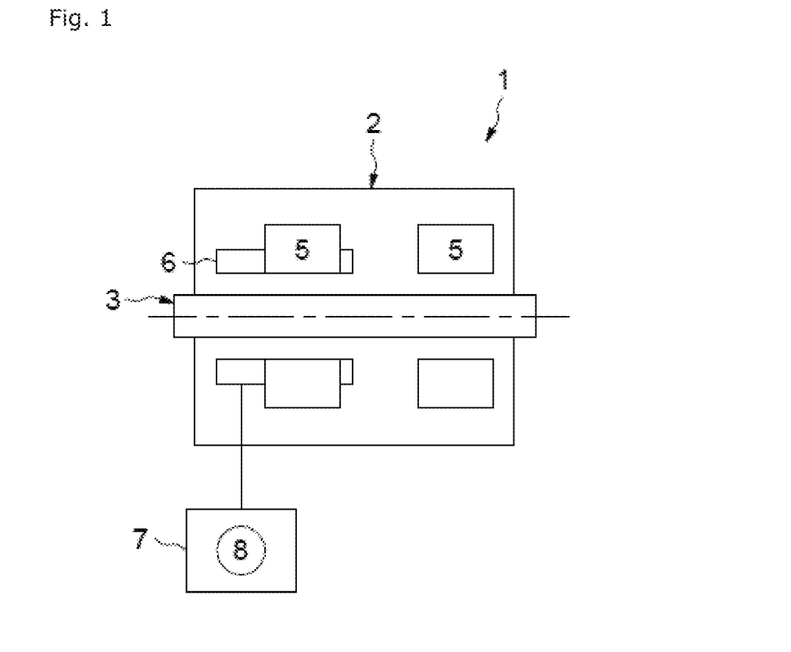
FIG. 1 illustrates schematically a machine according to the present disclosure.

Reference is made to FIG. 1 which represents schematically a partial longitudinal cross section of a machine 1.

The machine 1 comprises a housing 2, a rotor 3 supported in the housing 2 by two active magnetic bearings 5.

The rotor 3 is surrounded by the active magnetic bearings 5.

The machine 1 employs at least two inductive position sensors 6 to measure the radial displacement of the rotor 3 between the active magnetic bearings 5.

Both of the inductive position sensors 6 measure radial displacement of the rotor 3. Additional inductive position sensors may be employed to measure radial or axial displacement of the rotor 3.

For clarity reasons, only one inductive position sensor 6 is represented on FIG. 1.

The machine 1 contains a sensor driver circuit 7 comprising an alternating current (AC) source 8.

The sensor driver circuit 7 supplies the inductive position sensor 6 with power.

The sensor driver circuit 7 may be located outside the machine 1 as represented.

The sensor driver circuit 7 may supply more than one inductive position sensor 6 with power.

In variant, the sensor driver circuit 7 is located inside the machine 1.

Figure 2:
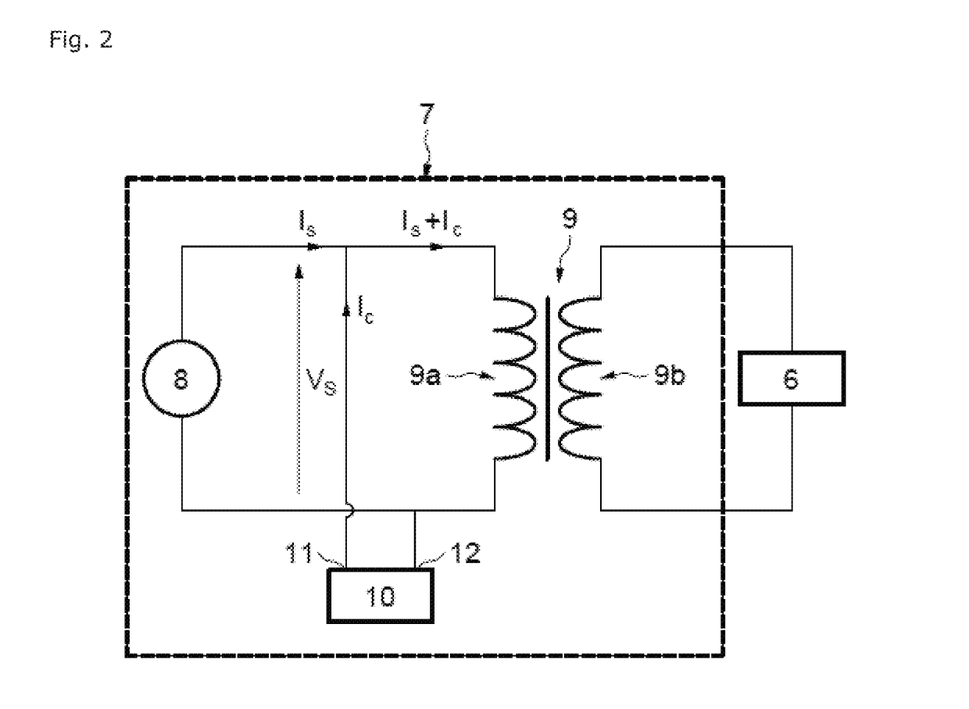
FIG. 2 illustrates schematically an example of an inductive position sensor driver circuit according to the present disclosure.

FIG. 2 illustrates schematically an example of the sensor driver circuit 7.

The sensor driver circuit 7 contains a transformer 9 with a primary circuit 9a and a secondary circuit 9b.

The primary circuit 9a is connected to the AC source 8 and the secondary circuit 9b is connected to the inductive position sensor 6.

The AC source 8 delivers a current $I_S$ and a voltage $V_S$ having, for example, a sinusoidal waveform.

The sensor driver circuit 7 contains a system 10 with a first terminal 11 connected to one end of the transformer primary circuit 9a and a second terminal 12 connected to the other end of the transformer primary circuit 9a.

The system 10 generates a compensating current $I_C$ so that the supply current $I_S$ is in phase with the supply voltage $V_S$.

When the supply current $I_S$ is in phase with the supply voltage $V_S$, the AC source 8 does not deliver reactive power. The reactive power consumed by the inductive position sensor 6 is compensated by the system 10 generating the compensation current $I_C$.

The system 10 extracts or delivers the compensation current $I_C$ at the ends of the primary circuit 9a.

The extracted compensating current $I_C$ is stored in an energy storage device of the system 10.

The delivered compensating current $I_C$ is delivered from an energy storage device of the system 10.

Figure 3:
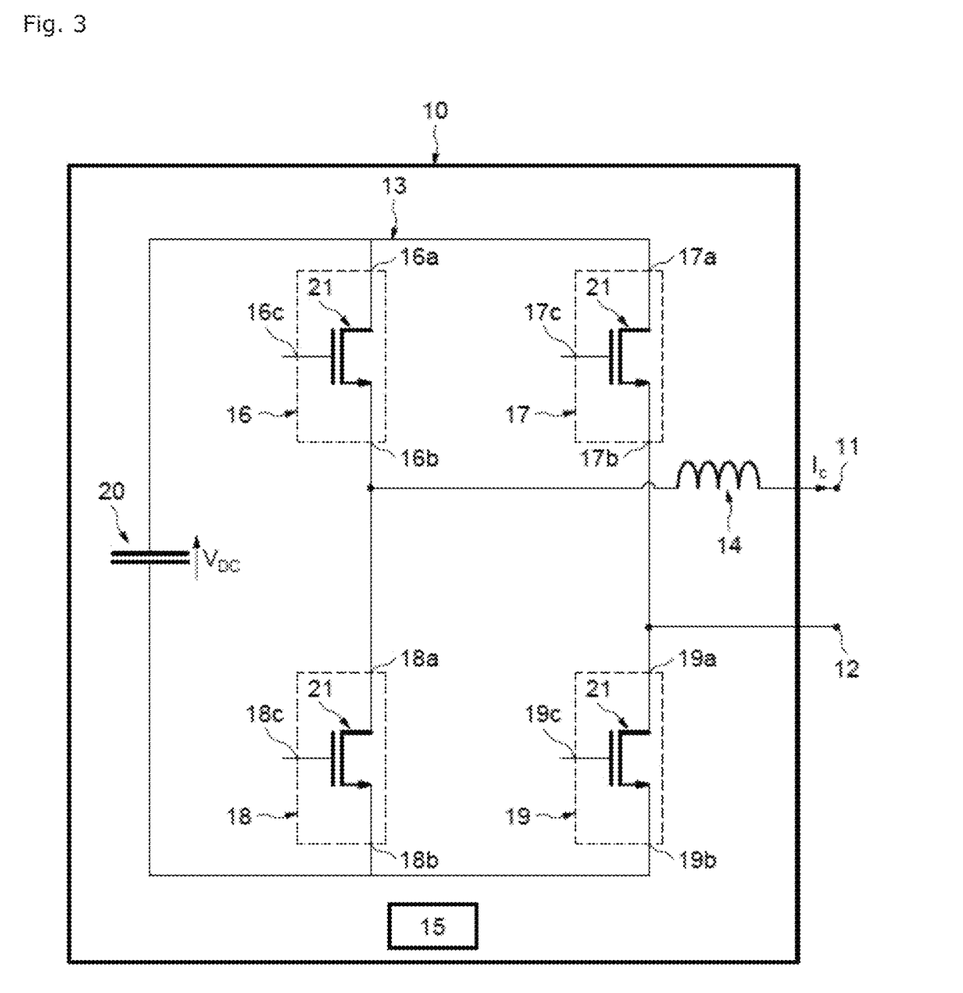
FIG. 3 illustrates schematically an example of a system for compensating the reactive power consumed by an inductive position sensor according to the present disclosure.

FIG. 3 illustrates schematically an example of the system 10.

The system 10 contains a full bridge converter connected to the first and second terminals 11, 12 and a filter inductor 14.

The system 10 additionally contains a control system 15 for controlling the full bridge converter 13.

The full bridge converter 13 contains four controlled switches 16, 17, 18, 19 and an energy storage device 20 employing, for example, a capacitor.

The energy storage device 20 stores or delivers the compensation current $I_C$.

The voltage between the terminals of the energy storage device 20 is noted $V_{DC}$.

Each controlled switch 16, 17, 18, 19 comprises a first connection 16a, 17a, 18a, 19a, a second connection 16b, 17b, 18b, 19b, and a control connection 16c, 17c, 18c, 19c connected to the control system 15 through an interface (not represented).

The first connection 16a of a first controlled switch 16 and the first connection 17a of a second controlled switch 17 are connected to a first end of the energy storage device 20.

The second connection 18b of a third controlled switch 18 and the second connection 19b of the fourth controlled switch 19 are connected to the second end of the energy storage device 20.

The second connection 16b of the first controlled switch 16 and the first connection 18a of the third controlled switch 18 are connected to a first end of the filter inductor 14. The second end of filter inductor 14 is connected to the first terminal 11.

The second connection 17b of the second controlled switch 17 and the first connection 19a of the fourth controlled switch 19 are connected to the second terminal 12.

Each controlled switch 16, 17, 18, 19 may be a transistor, for example a Metal Oxide Semiconductor Field Effect Transistor (MOSEFT) 21, containing a body diode (not represented).

The transistor 21 may be an insulated Gate Bipolar Transistor (IGBT), a silicon carbide (SiC) transistor or a Metal Oxide Semiconductor Field Effect Transistor (MOSEFT).

The drain of the transistor 21 is connected to the first connection 16a, 17a, 18a, 19a of the controlled switch 16, 17, 18, 19.

The source of the transistor 21 is connected to the second connection 16b, 17b, 18b, 19b of the controlled switch 16, 17, 18, 19.

The gate of the transistor 21 is connected to the control connection 16c, 17c, 18c, 19c of the controlled switch 16, 17, 18, 19.

Figure 4:
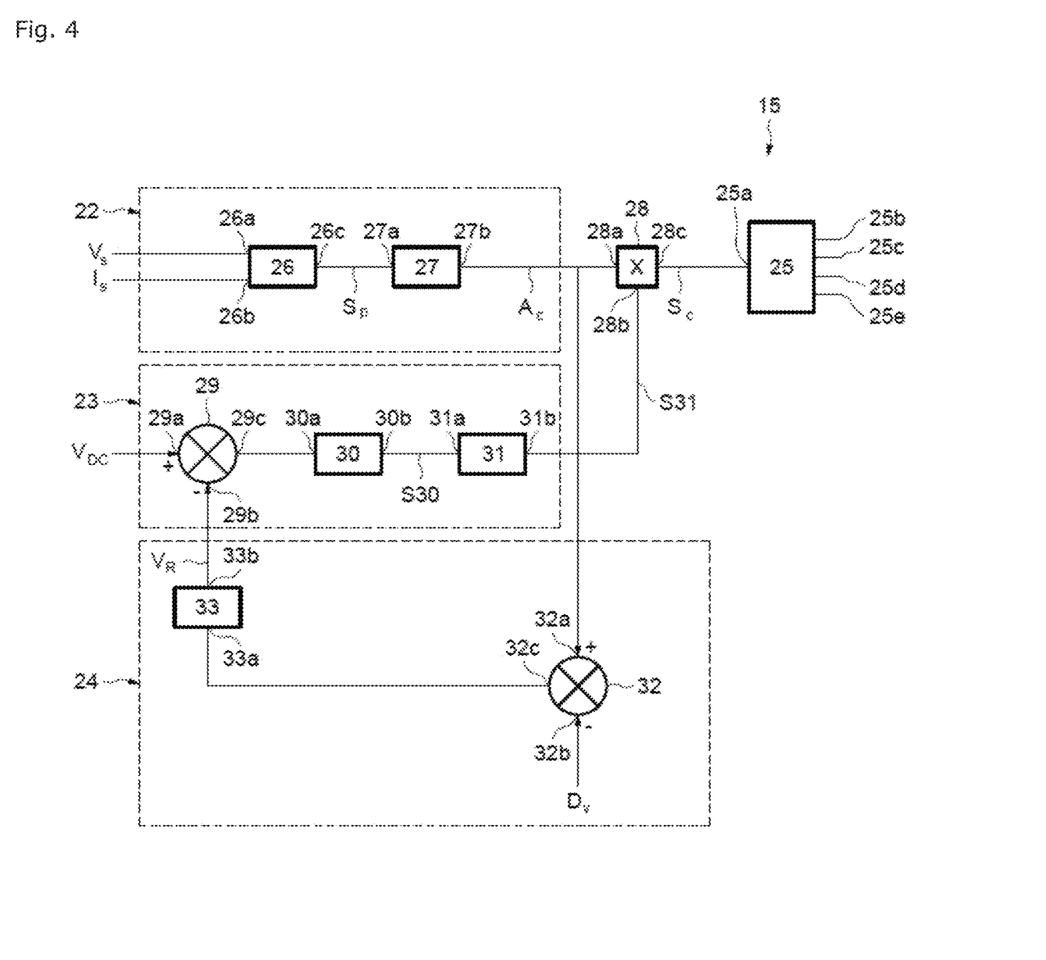
FIG. 4 illustrates schematically an example of a control system according to the present disclosure.

FIG. 4 illustrates schematically an example of the control system 15.

The control system 15 contains a first control loop 22 controlling the amplitude $A_C$ of a control signal $S_C$, a second control loop 23 controlling the phase shift of the control signal $S_C$, and a third control loop 24 controlling the voltage reference for an energy storage device 20.

The controlled switches 16, 17, 18, 19 are controlled from the control signal $S_C$.

The control system 15 further contains a controlling means employing for example a pulse signal generator 25.

The pulse signal generator 25 comprises an input 25a and four outputs 25b, 25c, 25d, 25e.

Each output 25b, 25c, 25d, 25e of the pulse signal generator 25 is connected to a different control connection 16c, 17c, 18c, 19c.

The pulse signal generator 25 controls the switches 16, 17, 18, 19 of the full bridge converter 13 according to a control signal $S_C$ received on the input 25a of the pulse signal generator 25.

The control signal Sc may be a modulating signal.

The pulse generator 25 may be based on Pulse Width Modulation (PWM) or pulse frequency modulation (PFM).

For example, a first output 25b is coupled to the control connection 16c of the first switch 16, a second output 25c is coupled to the control connection 17c of the second switch 17, a third output 25d is coupled to the control connection 18c of the third switch 18, and a fourth output 25e is coupled to the control connection 19c of the fourth switch 19.

The first control loop 22 contains a phase shift determining means 26 intended to determine the phase shift between the supply voltage VS and the supply current IS, as well as a controller 27.

The phase shift determining means 26 comprises a first input 26a receiving the supply voltage $V_S$, a second input 26b receiving the supply current $I_S$, and an output 26c connected to an input 27a of the controller 27.

The phase shift determining means 26 delivers an output 26c. The output 26c is a signal $S_P$ representative of the phase shift between the supply voltage VS and the supply current $I_S$.

The first controller 27 has an output 27b connected to a first input 28a of a multiplier 28 of the control system 15.

The controller 27 determines the amplitude $A_C$ of the control signal $S_C$ from the phase shift delivered on the output 26c of the phase shift determining means 26.

The controller 27 may employ a proportional integral (PI) controller.

The multiplier 28 comprises two inputs 28a and 28b, and an output 28c connected to the input 25 of the pulse signal generator 25.

The output 28c of the multiplier 28 delivers the control signal Sc.

The second control loop 23 is designed to determine the phase of the control signal $S_C$ from the voltage $V_{DC}$ of the energy storage device 20 and the reference voltage $V_R$.

The third control loop 24 is designed to determine the reference voltage $V_R$ from the amplitude $A_C$ and a reference duty cycle $D_V$.

The control signal is determined by the control system 15 so that the supply current $I_S$ is in phase with the supply voltage $V_S$.

The second control loop 23 comprises a first subtraction 29 comprising a first input 29a receiving the voltage $V_{DC}$ of the energy storage device 20, a second input 29b, and an output 29c.

The output 29c is equal to the difference between the first input 29a and the second input 29b.

The output 29b of the first comparator 29 is connected to an input 30a of a controller 30.

The controller 30 may employ a PI controller.

An output 30b of the first controller 30 is connected to an input 31a of a periodic function generator 31.

The first controller 30 delivers a signal S30 on the output 30b.

The periodic function generator 31 comprises an output 31b connected to the second input 28b of the multiplier 28.

The periodic function generator 31 delivers a signal S31 on the output 31b.

The periodic function generator 31 generates a periodic function from a signal delivered by the controller 30.

The periodic function generator 31 may be a sinusoidal function.

The third control loop 24 contains a subtraction 32 which comprises a first input 32a connected to the output 27b of the first control loop 22, a second input 32b receiving the duty cycle reference value $D_P$, and an output 32c connected to an input 33a of a controller 33.

The output 32c delivers an error signal equal to the difference between the first input 32a and the second input 32b.

The controller 33 comprises an output 33b connected to the second input 29b of the comparator 29.

The controller 33 delivers the voltage reference $V_R$.

The controller 33 may employ a PI controller.

The control signal Sc is equal to the multiplication of the amplitude AC with the signal S31 delivered by the periodic function generator 31.

Figure 5:
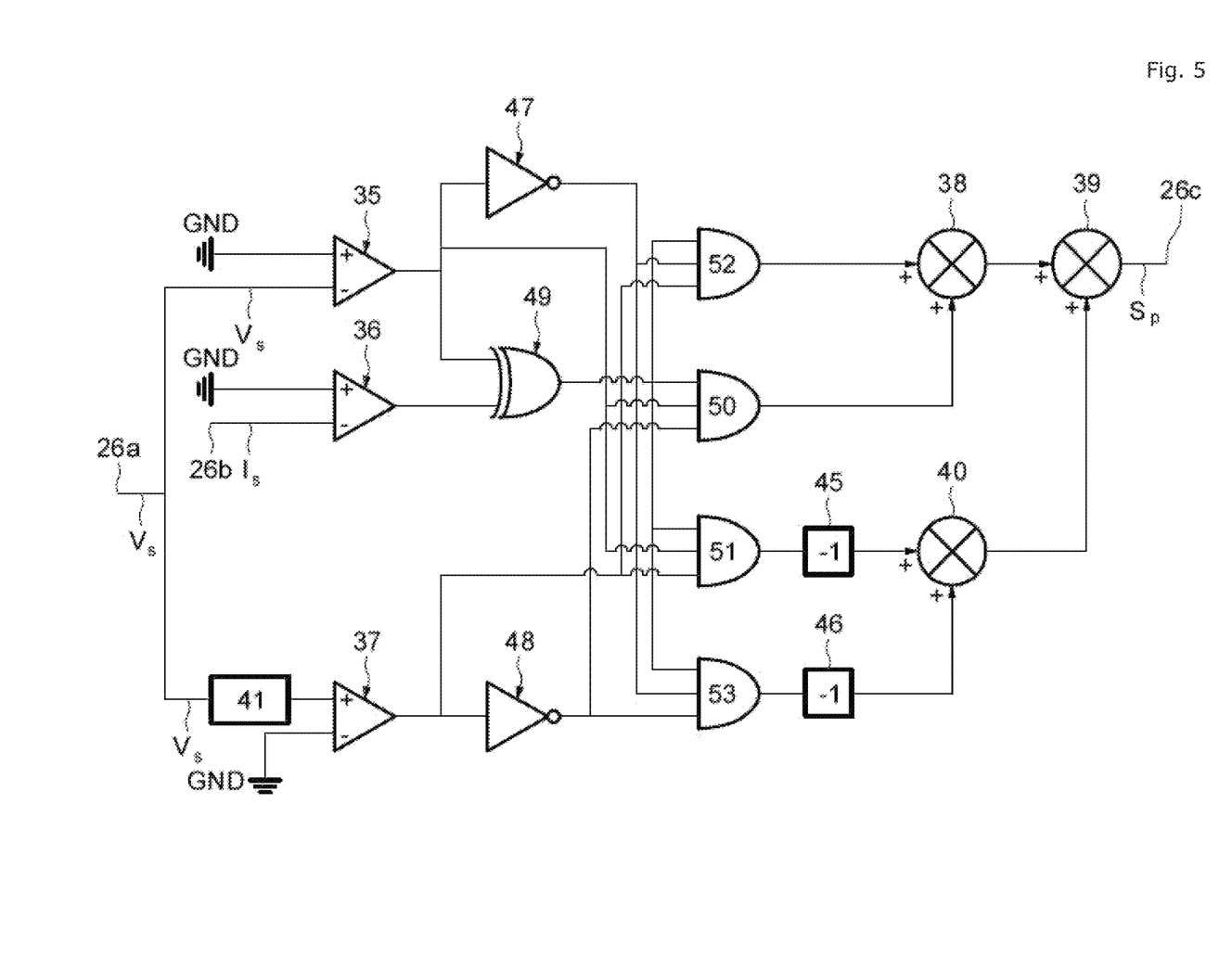
FIG. 5 illustrates schematically an example of a phase shift determining means according to the present disclosure.

FIG. 5 illustrates schematically an example of the phase shift determining means 26.

The phase shift determining means 26 comprises a logic circuit comprising three logical comparators 35, 36, 37, three summation operators 38, 39, 40, one differentiator 41, two gains 45, 46, two NOT gates 47, 48, one XOR gate 49, and four 3-input AND gates 50, 51, 52, 53.

Each logical comparator 35, 36, 37 comprises a positive input, a negative input, and an output.

When the value of the positive input is greater than the value of the negative input, the output delivers a logic high state "1", and when the positive input is smaller than the value of the negative input, the output delivers a logic low state "0".

The positive input of a first and a second logical comparators 35, 36, and the negative input of the third logical comparator 37 are connected to a ground GND.

The negative input of the first logical comparator 35 and an input of the differentiator 41 are connected to the first input 26a of the phase shift determining means 26 receiving the supply voltage $V_S$.

The output of the differentiator 41 is connected to the positive input of the third logical comparator 37.

The differentiator 41 determines the derivative of the supply voltage $V_S$.

The positive input of the second logical comparator 36 is connected to the second input 26b of the phase shift determining means 26 receiving the supply current $I_S$.

The output of the first logical comparator 35 is connected to the input of a first NOT gate 47, to a first input of the XOR gate 49, and to a second input of a first and a second AND gates 50, 51.

The output of the second logical comparator 36 is connected to a second input of the XOR gate 49.

The output of the third logical comparator 37 is connected to the input of the second NOT gate 48, to a third input of a third AND gate 52, and a third input of the second AND gate 51.

The output of the first NOT gate 47 is connected to a second input of the third AND gate 52 and to a first input of the fourth AND gate 53.

An output of the XOR gate 49 is connected to a first input of the first, second, third and fourth AND gates 50, 51, 52, 53.

An output of the second NOT gate 48 is connected to a third input of the first and fourth AND gates 50, 53.

The output of the third AND gate 52 is connected to a first input of a first summation operator 38 and the output of the first AND gate 50 is connected to a second input of the first summation operator 38.

The output of the first summation operator 38 is connected to a first input of a second summation operator 39.

Each of the gains 45, 46 comprises an input and an output.

The gains 45, 46 have a negative unitary value so that the output of each gain is equal to the negative value on the input of said gain.

The input of the first gain 45 is connected to the output of the second AND gate 51 and the input of the second gain 46 is connected to the output of the fourth AND gate 53.

The output of the first gain 45 is connected to a first input of the third summation operator 40 and the output of the second gain 46 is connected to a second input of the third summation operator 40.

The output of the third summation operator 40 is connected to a second input of the second summation operator 39.

An output of the second summation operator 39 is connected to the output 26c of the phase shift determining means 26.

Each summation operator 38, 39, 40 delivers on its output the sum of the values received on its inputs.

The signal $S_P$ may have three states, a first state is "1", a second state is "−1", and the third state is "0".

When the sign of the supply voltage $V_S$ and the sign of the supply current $I_S$ are identical, the first and second logical comparators 35, 36 deliver the logic high state "1" or the logic low state "0" so that the output of the XOR gate 49 is equal to "0". Consequently, the outputs of the AND gate 50, 51, 52, 53 are in the logic low state "0".

The signal $S_P$ is in the third state "0".

When the sign of the supply voltage $V_S$ is positive and the sign of the supply current $I_S$ is negative, the first logical comparator 35 delivers the logic low state "0" and the second logical comparator 36 delivers the logic high state "1" so that the XOR gate 49 delivers the logic high state "1" and the first NOT gate 47 delivers the logic high state "1".

If the supply voltage $V_S$ is increasing, the differentiator 41 delivers a positive value so that the third logical comparator 37 delivers the logic high state "1". The second NOT gate 48 delivers the logic low state "0". The first, second, and third inputs of the third AND gate 52 are in the logic high state "1" so that output of the third AND gate 52 is in the logic high state "1". The outputs of the first, second and fourth AND gates 50, 51, 53 are in the logic low state "0". The signal $S_P$ is in the first state "1" in which the supply current $I_S$ lags the supply voltage.

If the supply voltage $V_S$ is decreasing, the differentiator 41 delivers a negative value so that the third logical comparator 37 delivers the logic low state "0". The second NOT gate 48 delivers the logic high state "1". The first, second, and third inputs of the fourth AND gate 53 are in the logic high state "1" so that output of the fourth AND gate 53 is in the logic high state "1". The outputs of the first, second and third AND gates 50, 51, 52 are in the logic low state "0". The signal $S_P$ is in the second state "−1" in which the supply current $I_S$ leads the supply voltage $V_S$.

When the sign of the supply voltage $V_S$ is negative and the sign of the supply current $I_S$ is positive, the first logical comparator 35 delivers the logic high state "1" and the second logical comparator 36 delivers the logic low state "0" so that the XOR gate 49 delivers the logic high state "1" and the first NOT gate 47 delivers the logic low state "0".

If the supply voltage $V_S$ is increasing, the differentiator 41 delivers a positive value so that the third logical comparator 37 delivers the logic high state "1". The second NOT gate 48 delivers the logic low state "0". The first, second, and third inputs of the second AND gate 51 are in the logic high state "1" so that the output of the second AND gate 51 is in the logic high state "1". The outputs of the first, third and fourth AND gates 50, 52, 53 are in the logic low state "0". The signal $S_P$ is in the second state "−1" in which the supply current $I_S$ leads the supply voltage $V_S$.

If the supply voltage $V_S$ is decreasing, the differentiator 41 delivers a negative value so that the third logical comparator 37 delivers the logic low state "0". The second NOT gate 48 delivers the logic high state "1". The first, second, and third inputs of the first AND gate 50 are in the logic high state "1" so that the output of the first AND gate 50 is in the logic high state "1". The outputs of the second, third, and fourth AND gates 51, 52, 53 are in the logic low state "0". The signal $S_P$ is in the first state "1" in which the supply current IS lags the supply voltage $V_S$.

In a first embodiment of the periodic function generator 31, the periodic function generator delivers the signal S31 equal to:

$$S31(t) = \sin(\omega t + S30(t) + \omega 0) \quad (1)$$

where ω0 is a phase synchronised with the supply voltage $V_S$, and ω is equal to:

$$\omega = 2\pi f \quad (2)$$

where f is the frequency of the AC source 8.

Figure 6:
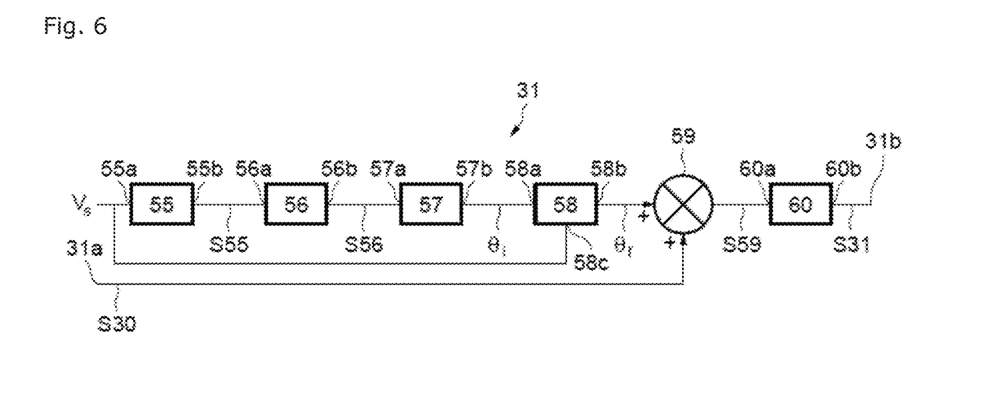
FIG. 6 illustrates schematically a second embodiment of the periodic function generator according to the present disclosure.

FIG. 6 illustrates a second embodiment of the periodic function generator 31.

Contrary to the first embodiment of the periodic function generator 31 in which the AC source 8 frequency is known, in the second embodiment, a sinusoidal function is determined independently by measurement of the output voltage $V_S$ of the AC source 8.

The periodic function generator 31 comprises three transfer functions 55, 57, 60 a limiter 56, an angle conversion module 58, and a summation operator 59.

A first transfer function 55 comprises an input 55a receiving the supply voltage $V_S$ and an output 55b connected to an input 56a of the limiter 56.

The first transfer function 55 delivers on the output 55b a signal S55:

$$S55 = \frac{V_S}{\text{rms}(V_S) \cdot \sqrt{2}} \quad (3)$$

where rms is the root mean square function.

The signal S55 is the supply voltage reference phase.

The limiter 56 comprises an output 56b connected to an input 57a of a second transfer function 57 and delivers a signal S56 on the output 56b between one and minus one.

The second transfer function 57 comprises an output 57b connected to an input 58a of the angle conversion module 58.

The second transfer function 57 delivers an angle θi representing the phase of the supply voltage $V_S$ on the output 57b equal to:

$$\theta_i = \arcsine(S56) \quad (4)$$

The value of the angle $\theta_i$ being between −90° and +90°.

The conversion module 58 converts the angle $\theta_i$ to a reference angle $\theta_f$ between 0° and 360° to represent a full period of the supply voltage $V_S$.

The reference angle $\theta_f$ is delivered on an output 58b of the conversion module 58.

The output 58b is connected to a first input of the summation operator 59.

The conversion module 58 comprises a second input 58c receiving the supply voltage $V_S$.

The summation operator 59 comprises a second input connected to the input 31a of a periodic function generator 31.

The summation operator 59 comprises an output connected to an input 60a of the third transfer function 60.

The summation operator 59 delivers a signal S59 on its output equal to:

$$S59 = S30 + \theta_f \quad (5)$$

The third transfer function 60 comprises an output 60b connected to the output 31b of the periodic function generator 31.

The third transfer function 60 delivers the signal S31 on the output 31b equal to:

$$S31 = \sin(S59) \quad (6)$$

The periodic function S31 results from the multiplication of the supply voltage reference phase S55 shifted by the reference angle θf.

Figure 7:
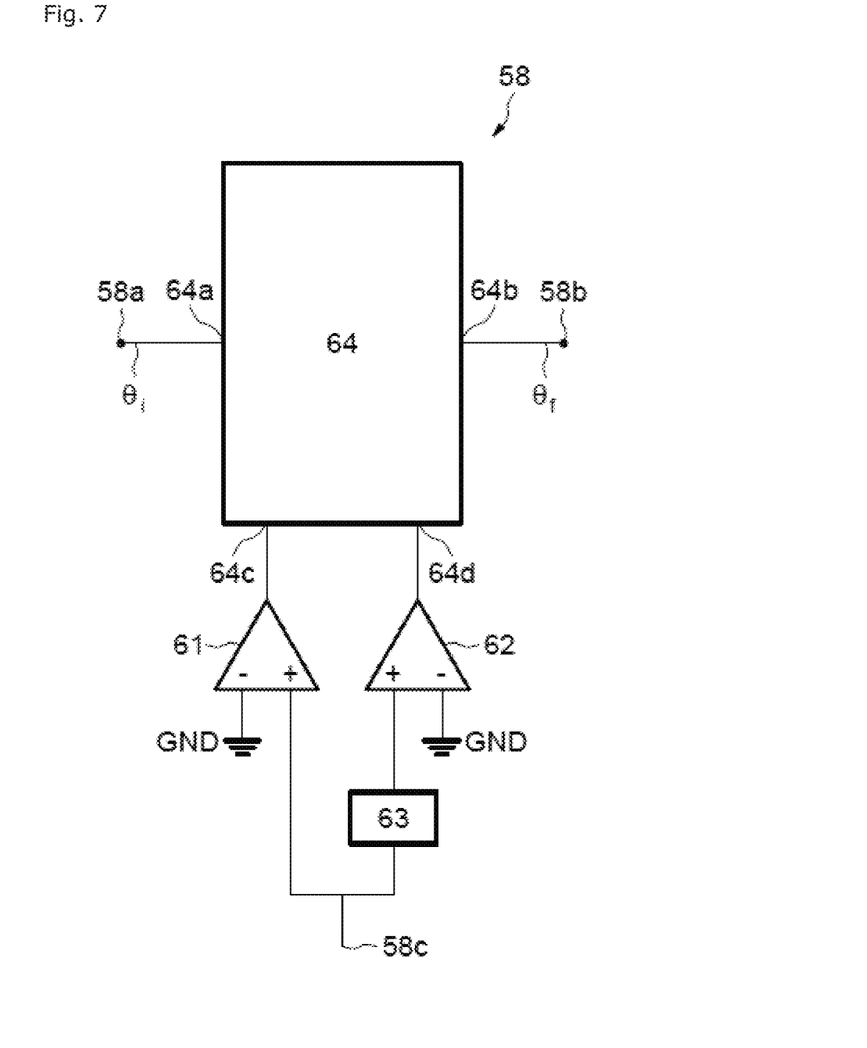
FIG. 7 illustrates schematically an example of an angle conversion module according to the present disclosure.

FIG. 7 illustrates an example of the conversion module 58.

The conversion module 58 comprises two logical comparators 61, 62, a differentiator 63, and a state machine 64.

The state machine 64 comprises an input 64a connected to the input 58a of the angle conversion module 58, an output 64b connected to the output 58b of the angle conversion module 58, a first control input 64c connected to the output of a first logical comparator 70, and a second control input 64d connected to the output of the second logical comparator 62.

The negative input of the logical comparators 70, 71 is connected to the ground GND.

The positive input of the first logical comparator 61 and the input of the differentiator 63 are connected to the second input 58c of the angle conversion module 58.

The output of the differentiator 63 is connected to the positive input of the second logical comparator 62.

When the supply voltage $V_S$ is positive, the first logical comparator 61 delivers the logic high state "1".

When the supply voltage $V_S$ is negative, the first logical comparator 61 delivers the logic low state "0".

When the supply voltage $V_S$ is increasing, the second logical comparator 62 delivers the logic high state "1".

When the supply voltage $V_S$ is decreasing, the second logical comparator 62 delivers the logic low state "0".

The state machine 64 determines the reference angle $\theta_f$ as explained in the following.

When the first logical comparator 61 delivers the logic low state "0" and the second logical comparator 62 delivers the logic low state "0", the state machine 64 converts the angle $\theta_i$ between $-90°$ and $+90°$ in the corresponding reference angle $\theta_f$ between 180° and 270°.

When the first logical comparator 61 delivers the logic low state "0" and the second logical comparator 62 delivers the logic high state "1", the state machine 64 converts the angle $\theta_i$ between $-90°$ and $+90°$ in the corresponding reference angle $\theta_f$ between 270° and 360°.

When the first logical comparator 61 delivers the logic high state "1" and the second logical comparator 62 delivers the logic low state "0", the state machine 64 converts the angle $\theta_i$ between $-90°$ and $+90°$ in the corresponding reference angle $\theta_f$ between 90° and 180°.

When the first logical comparator 61 delivers the logic low state "1" and the second logical comparator 62 delivers the logic low state "1", the state machine 64 converts the angle $\theta_i$ between $-90°$ and $+90°$ in the corresponding reference angle $\theta_f$ between 0° and 90°.

Figure 8:
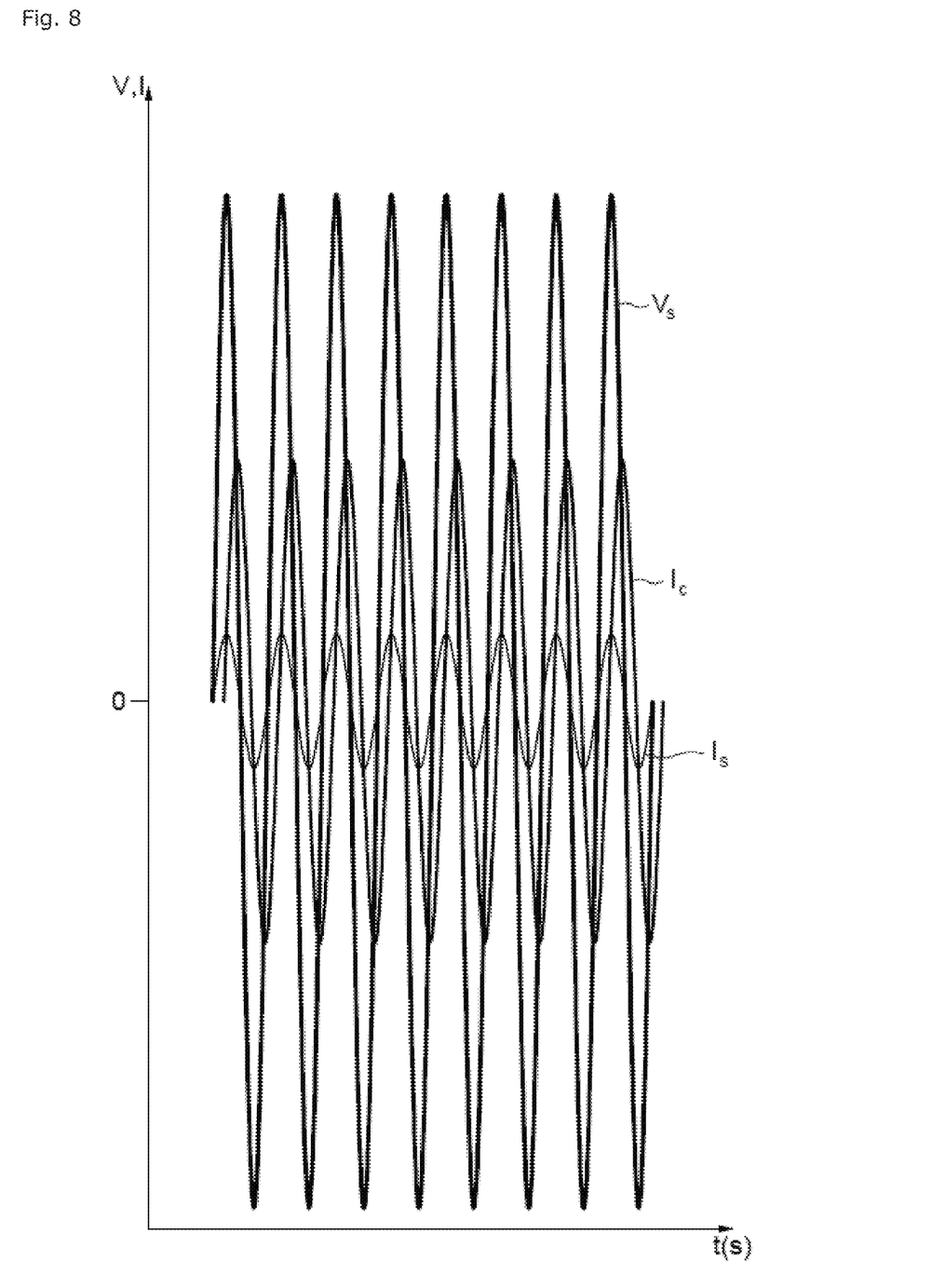
FIG. 8 illustrates graphically an example of the waveforms of a supply voltage, a supply current, and a compensation current according to the present disclosure.

FIG. 8 illustrates an example of the characteristic waveforms of the supply voltage $V_S$, the supply current $I_S$ and the compensation current $I_C$.

The supply voltage $V_S$ is in phase with the supply current $I_S$.

The system 10 controlled by the control system 15 also referred to as an active capacitor, a reactive power compensator, or a power factor correction circuit, may be used to compensate many different sensor/cable combinations without changing circuit element values of the control system 15.

Furthermore, the control system 15 is not influenced by the time delay caused by the sensors/filters.

The control system 15 varies the voltage of the energy storage device 20 so that the system 10 is adapted to compensate the reactive power consumed by different types of inductive position sensors 6.

What is claimed is:

1. A method for compensating the reactive power consumed by at least one inductive position sensor for a rotor of an electrical machine supported by at least one active magnetic bearing, the inductive position sensor measuring a displacement of a rotor and being supplied by an alternating current source, the method comprising:
   determining a phase shift between a supply voltage and a supply current delivered by the alternating current source;
   determining the amplitude of a control signal from the determined phase shift ($S_P$);
   determining a voltage reference value for an energy storage device from the amplitude of the control signal and a duty cycle reference value;
   determining the phase of the control signal from the voltage of the energy storage device and the voltage reference; and
   controlling the full bridge converter according to the control signal to generate the compensation current to bring the supply current in phase with the supply voltage.

2. The method according to claim 1, wherein determining the phase shift comprises determining the sign of the supply voltage, the sign of the supply current, and the sign of the derivative of the supply voltage:
   the supply current lags the supply voltage when the sign of the supply voltage is positive, the sign of the supply current is negative, and the sign of the derivative of the supply voltage is positive or when the sign of the supply voltage is negative, the sign of the supply current is positive, and the sign of the derivative of the supply voltage is negative;
   the supply current leads of the supply voltage when the sign of the supply voltage is positive, the sign of the supply current is negative, and the sign of the derivative of the supply voltage is negative or when the sign of the supply voltage is negative, the sign of the supply current is positive, and the sign of the derivative of the supply voltage is positive; and
   the supply current is in phase with the supply voltage when the sign of the supply voltage is always equal to the sign of the supply current.

3. The method according to claim 1, wherein the control signal is a periodic function having the same frequency as the frequency of the supply voltage.

4. The method according to claim 1, wherein the control signal is a periodic function resulting from the multiplication of a supply voltage reference phase shifted by a reference angle by the amplitude of the control signal.

5. The method according to claim 4, wherein the reference angle is determined from the supply voltage.

6. The method according to claim 3, wherein the periodic function is a sinusoidal function.

7. The method according to claim 2, wherein the control signal is a periodic function having the same frequency as the frequency of the supply voltage.

8. The method according to claim 2, wherein the control signal is a periodic function resulting from the multiplication of a supply voltage reference phase shifted by a reference angle by the amplitude of the control signal.

9. The method according to claim 8, wherein the reference angle is determined from the supply voltage.

10. The method according to claim 9, wherein the periodic function is a sinusoidal function.

11. A control system for controlling a full bridge converter to compensate the reactive power consumed by at least one inductive position sensor for a rotor of an electrical machine supported by at least one active magnetic bearing, the inductive position sensor measuring a displacement of a rotor and being supplied by an alternating current source, the control system comprising:
   a phase shift determining means configured to determine the phase shift between a supply voltage and a supply current delivered by the alternating current source,
   a first control loop configured to control the amplitude of a control signal from the determined phase shift,
   a second control loop configured to control the phase of the control signal from the voltage of the energy storage device and a voltage reference,
   a third control loop configured to control a voltage reference for an energy storage device from the amplitude of the control signal and a duty cycle reference value, and
   a controlling means configured to control the full bridge converter according to the control signal to generate the compensation current to bring the supply current in phase with the supply voltage.

12. The control system according to claim 11, wherein the phase shift determining means comprises a logic circuit comprising a least three logical comparators, a plurality of logic gates, a plurality of summation operators, a controller, and at least one differentiator, the logic circuit being configured to determine the sign of the supply voltage and the sign of the supply current, and the sign of the derivative of the supply voltage:

the supply current lags the supply voltage when the sign of the supply voltage is positive, the sign of the supply current is negative, and the sign of the derivative of the supply voltage is positive or when the sign of the supply voltage is negative, the sign of the supply current is positive, and the sign of the derivative of the supply voltage is negative, the supply current leads the supply voltage when the sign of the supply voltage is positive, the sign of the supply current is negative, and the sign of the derivative of the supply voltage is negative or when the sign of the supply voltage is negative, the sign of the supply current is positive, and the sign of the derivative of the supply voltage is positive, and the supply current is in phase with the supply voltage when the sign of the supply voltage is always equal to the sign of the supply current.

13. A system for compensating the reactive power consumed by at least one inductive position sensor for a rotor of an electrical machine supported by at least one active magnetic bearing, the inductive position sensor measuring a displacement of a rotor, the system comprising:
    a control system according to claim 11; and
    a full bridge converter comprising four switches and an energy storage device, each switch being coupled to the control system to transfer the compensation current to and from the energy storage device.

14. A system for compensating the reactive power consumed by at least one inductive position sensor for a rotor of an electrical machine supported by at least one active magnetic bearing, the inductive position sensor measuring a displacement of a rotor, the system comprising:
    a control system according to claim 12; and
    a full bridge converter comprising four switches and an energy storage device, each switch being coupled to the control system to transfer the compensation current to and from the energy storage device.

15. A sensor driver circuit for at least one inductive position sensor for a rotor of an electrical machine supported by at least one active magnetic bearing, the inductive position sensor measuring a displacement of a rotor, the sensor comprising:
    a transformer including a primary circuit and a secondary circuit configured to supply the inductive position sensor;
    an alternating current source connected to the primary circuit; and
    a system according to claim 13 connected to the primary circuit.

16. A sensor driver circuit for at least one inductive position sensor for a rotor of an electrical machine supported by at least one active magnetic bearing, the inductive position sensor measuring a displacement of a rotor, the sensor comprising:
    a transformer including a primary circuit and a secondary circuit configured to supply the inductive position sensor;
    an alternating current source connected to the primary circuit; and
    a system according to claim 14 connected to the primary circuit.

* * * * *